(12) United States Patent
Ito et al.

(10) Patent No.: US 9,287,808 B2
(45) Date of Patent: Mar. 15, 2016

(54) MOTOR CONTROLLER AND CONSTRUCTION MACHINE PROVIDED THEREWITH

(71) Applicants: SINFONIA TECHNOLOGY CO., LTD., Tokyo (JP); KOBELCO CONSTRUCTION MACHINERY CO., LTD., Hiroshima-shi, Hiroshima (JP)

(72) Inventors: Takeo Ito, Tokyo (JP); Hideaki Moriya, Tokyo (JP); Takeshi Tomizaki, Tokyo (JP); Akira Nakazumi, Hiroshima (JP); Yusuke Kamimura, Hiroshima (JP)

(73) Assignees: SINFONIA TECHNOLOGY CO., LTD., Tokyo (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/289,957

(22) Filed: May 29, 2014

(65) Prior Publication Data
US 2014/0354197 A1 Dec. 4, 2014

(30) Foreign Application Priority Data

May 30, 2013 (JP) .................................. 2013-113581

(51) Int. Cl.
*H02P 23/00* (2006.01)
*H02P 3/18* (2006.01)
*H02P 21/00* (2006.01)
*H02P 29/02* (2006.01)

(52) U.S. Cl.
CPC .............. *H02P 3/18* (2013.01); *H02P 21/0092* (2013.01); *H02P 29/027* (2013.01)

(58) Field of Classification Search
CPC .................................................. H02P 23/0063
USPC .......................................... 318/366, 364, 362
See application file for complete search history.

(56) References Cited

U.S. PATENT DOCUMENTS

| 4,766,547 A  *  | 8/1988 | Modery et al. ................. 700/229 |
| 6,909,950 B2 * | 6/2005 | Shimizu .......................... 701/36 |
| 7,072,751 B2 * | 7/2006 | Shimizu ................ B60L 3/0084 |
| | | 340/3.43 |

(Continued)

FOREIGN PATENT DOCUMENTS

| EP | 1 153 783 A2 | 11/2001 |
| EP | 1 616 746 A2 | 1/2006 |

(Continued)

OTHER PUBLICATIONS

Extended European Search Reported dated Jul. 28, 2015, issued in counterpart EP application No. 14170665.5 (6 pages).

*Primary Examiner* — David S Luo
(74) *Attorney, Agent, or Firm* — Westerman, Hattori, Daniels & Adrian, LLP (57) ABSTRACT

There is obtained a configuration capable of rapidly decelerating a motor even if a failure occurs in the communication between a controller and a motor control unit in a motor controller in which a speed command is input from the controller to the motor control unit. A motor controller 1 is provided with a main controller 2, and a motor control unit 3 configured to be communicable with the main controller 2 to drive a motor M according to a torque command output from the main controller 2. The motor control unit 3 includes a speed control unit 31 for outputting a torque command, so as to decelerate the motor M, if any failure occurs in communication with the main controller 2 while the motor M is being driven.

4 Claims, 7 Drawing Sheets

(56) References Cited

U.S. PATENT DOCUMENTS

2004/0232864 A1* 11/2004 Sunaga et al. ............... 318/434
2013/0060432 A1    3/2013 Take et al.

FOREIGN PATENT DOCUMENTS

| JP | 3592144 B2 | 11/2004 |
| JP | 2011-200030 A | 10/2011 |

* cited by examiner

MOTOR CONTROLLER AND CONSTRUCTION MACHINE PROVIDED THEREWITH

BACKGROUND OF THE INVENTION

1. Field of the Invention

The present invention relates to a motor controller for controlling the drive of a motor.

2. Description of the Related Art

As a motor controller for controlling the drive of a motor, an inverter device used for the adjustable-speed drive of an AC motor is known, for example, as disclosed in Japanese Patent Publication No. 3592144. Such an inverter device is generally provided with an overcurrent protective device for performing gate shutdown when an excess current is detected. The overcurrent protective device that performs gate shutdown in this way determines that there is abnormality if a current feedback value sent from a current-detecting device arranged in a main circuit is not less than a predetermined value, and shuts a gate, thereby preventing damage from spreading to other parts in the inverter device.

On the other hand, the overcurrent protective device disclosed in Japanese Patent Publication No. 3592144 evaluates whether or not momentary current detection means for detecting currents of two or more phases is abnormal on the basis of the current values detected by the momentary current detection means. The overcurrent protective device prohibits the operation of the inverter device if any abnormal currents are observed.

SUMMARY OF THE INVENTION

Incidentally, in the case of such a simple configuration in which the drive of a motor is controlled using an inverter device as disclosed in Japanese Patent Publication No. 3592144, the rotation of the motor can be stopped by the inverter device in case of failure.

In the case of a configuration, however, in which the speed control of a motor is performed by outputting a drive command from the controller to a motor control unit, as in a case where a plurality of motors is controlled by a single controller, a situation arises in which any new drive commands are not input to the motor control unit if any failure occurs in communication between the controller and the motor control unit. In this situation, the motor control unit shuts a gate and cuts off current supply to the motor, in order to stop the motor. If the motor control unit cuts off current supply to the motor, the motor falls into a free-running state without being submitted to drive control. Consequently, safety may be impaired depending on the controlled object of the motor. If a plurality of motors is controlled in particular, the increased number of controlled objects may further impair safety.

An object of the present invention is to obtain a configuration capable of rapidly decelerating a motor even if a failure occurs in communication between a controller and a motor control unit in a motor controller in which a drive command is input from the controller to the motor control unit.

A motor controller according to one embodiment is provided with a controller, and a motor control unit configured to be capable of communicating with the controller to drive a motor according to a drive command output from the controller. The motor control unit includes a deceleration controller for outputting a drive command, so as to decelerate the motor, if any failure occurs in communication with the controller while the motor is being driven.

According to the motor controller in accordance with one embodiment, drive control is performed so as to decelerate the motor by the motor control unit by outputting a drive command from a deceleration controller of the motor control unit if any failure occurs in communication between the controller and the motor control unit. Consequently, it is possible to rapidly and safely decelerate or stop the motor even if a drive command is not input from the controller to the motor control unit.

DETAILED DESCRIPTION OF THE PREFERRED EMBODIMENTS

A motor controller according to one embodiment is provided with a controller, and a motor control unit configured to be capable of communicating with the controller to drive a motor according to a drive command output from the controller. The motor control unit includes a deceleration controller for outputting a drive command, so as to decelerate the motor, if any failure occurs in communication with the controller while the motor is being driven.

Consequently, the motor can be decelerated by the deceleration controller of the motor control unit even if any failure occurs in communication between the controller and the motor control unit. It is therefore possible to prevent the motor from falling into a free-running state. Accordingly, it is possible to safely and rapidly decelerate or stop the motor.

In addition, the above-described configuration eliminates the need to provide any auxiliary communication means to be used if a communication failure occurs between the controller and the motor control unit. Costs can thus be reduced.

The motor control unit further includes a communication failure detector for detecting a failure in communication with the controller, and a command selector for selecting a drive command output from the controller as a drive command for the motor if any communication failure is not detected by the communication failure detector, or selecting a drive command output from the deceleration controller as a drive command for the motor if a communication failure is detected by the communication failure detector.

Consequently, the drive command output from the deceleration controller of the motor control unit is selected by the command selector only if any failure occurs in communication between the controller and the motor control unit. Accordingly, regular motor control (normal control) is performed based on the drive command output from the controller when communication between the controller and the motor control unit is performed normally. On the other hand, it is possible to safely and rapidly decelerate or stop the motor by the drive command output from the deceleration controller if any communication failure occurs between the controller and the motor control unit.

The deceleration controller can decelerate or stop the motor by performing regenerative operation thereon so as to decelerate the motor.

The drive command is a torque command. The motor control unit further includes a torque limiter for limiting the torque command to a predetermined value or smaller. The torque limiter is configured to, in at least part of a rotational speed range in the regenerative operation region of the motor, make the predetermined value lower than a torque limiting value at the time of normal control of the motor, if any communication failure is detected by the communication failure detector.

Consequently, a torque command in the regenerative operation of the motor can be made smaller than a torque command in the normal control thereof if any failure occurs in communication between the controller and the motor control unit. Accordingly, the heat generation of the motor can be suppressed in the regenerative operation thereof performed at the time of communication failure.

A construction machine according to one embodiment is provided with the above-described motor controller, and a motor controlled by the motor controller. Accordingly, it is possible to safely and rapidly decelerate or stop the motor by applying the motor controller having the above-described configuration, even if any communication failure occurs between a controller and a plurality of motor controllers in a motor used to, for example, turn the construction machine.

Hereinafter, embodiments of the present invention will be described in detail with reference to the accompanying drawings. Constituent elements identical or corresponding to each other or one another in the figures are denoted by like reference numerals and characters and will not be discussed again.

Embodiment 1

Overall Configuration

Figure 1:
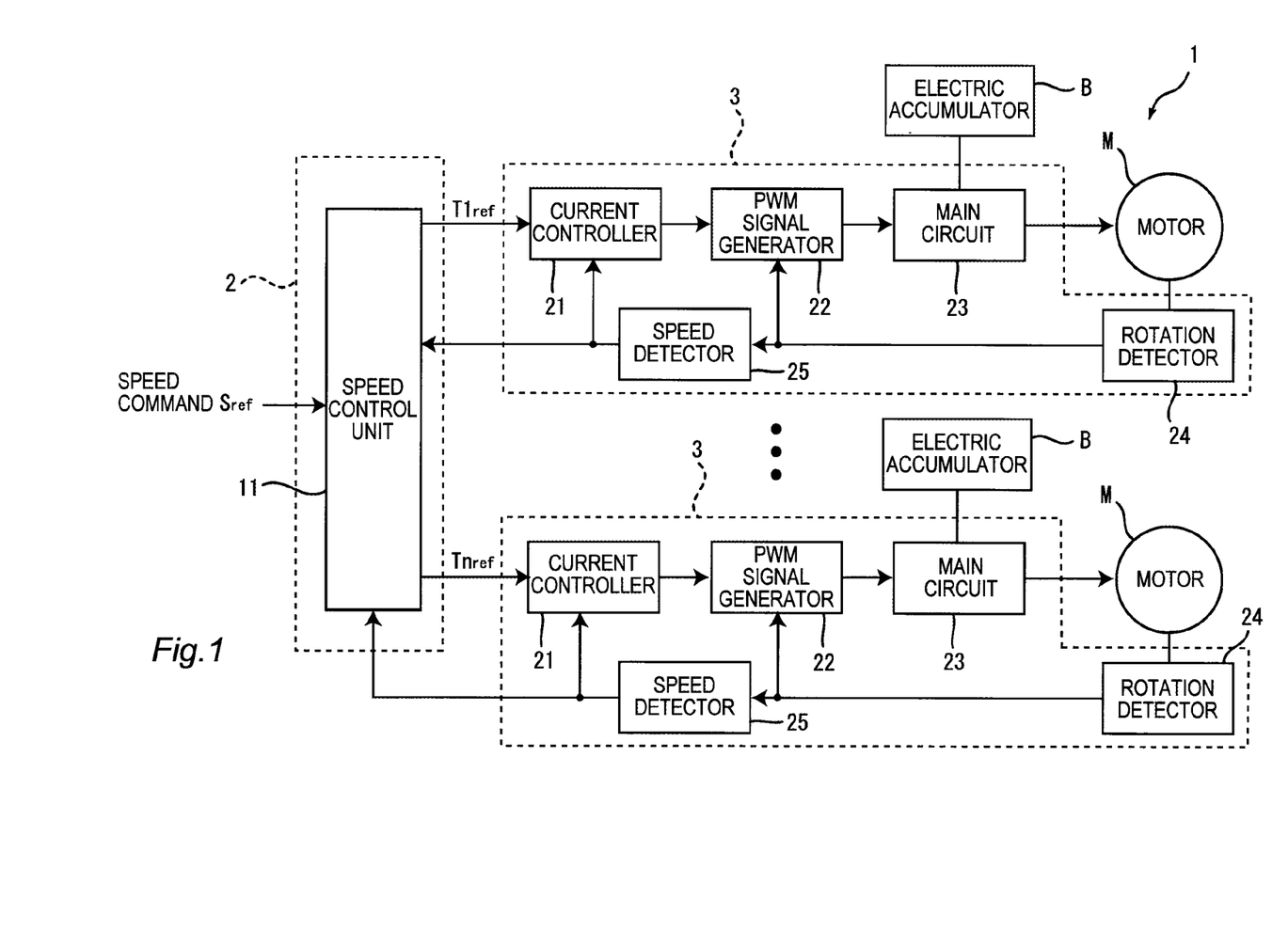
FIG. 1 is a block diagram illustrating a schematic configuration of a motor controller according to Embodiment 1.

FIG. 1 illustrates a motor controller 1 according to Embodiment 1. This motor controller 1 controls the drive of a plurality of motors M with a single main controller 2 (controller). Specifically, the motor controller 1 is provided with the main controller 2 and a plurality of motor control units 3. The motor controller 1 of the present embodiment is arranged in, for example, a construction machine (operating machine) provided with an electric accumulator B and a motor M. That is, the motor controller 1 controls the rotation of the motor M used to, for example, drive the engine of the construction machine and turn the vehicle body thereof.

Note that the motor M is not limited in particular and may be, for example, an IPM motor. In addition, the electric accumulator B may be of any structure, including a battery or a capacitor, as long as the accumulator is capable of accumulating electricity. In addition, the motor controller 1 may be applied to a machine other than construction machines, as long as the machine is provided with a motor.

The main controller 2 generates a torque command $Tn_{ref}$ (n is the number of motors M) for each motor control unit 3 according to a speed command $S_{ref}$. Specifically, the main controller 2 includes a speed control unit 11 for generating a torque command $Tn_{ref}$ appropriate for each motor M according to the speed command $S_{ref}$.

The motor control units 3 are arranged in association with the respective motors M. That is, assuming that the number of motors M controlled by the motor controller 1 is n, then the number of motor control units 3 included by the motor controller 1 is also n. The motor control units 3 are communicably connected to the main controller 2 by communication means capable of CAN communication or the like.

Figure 2:
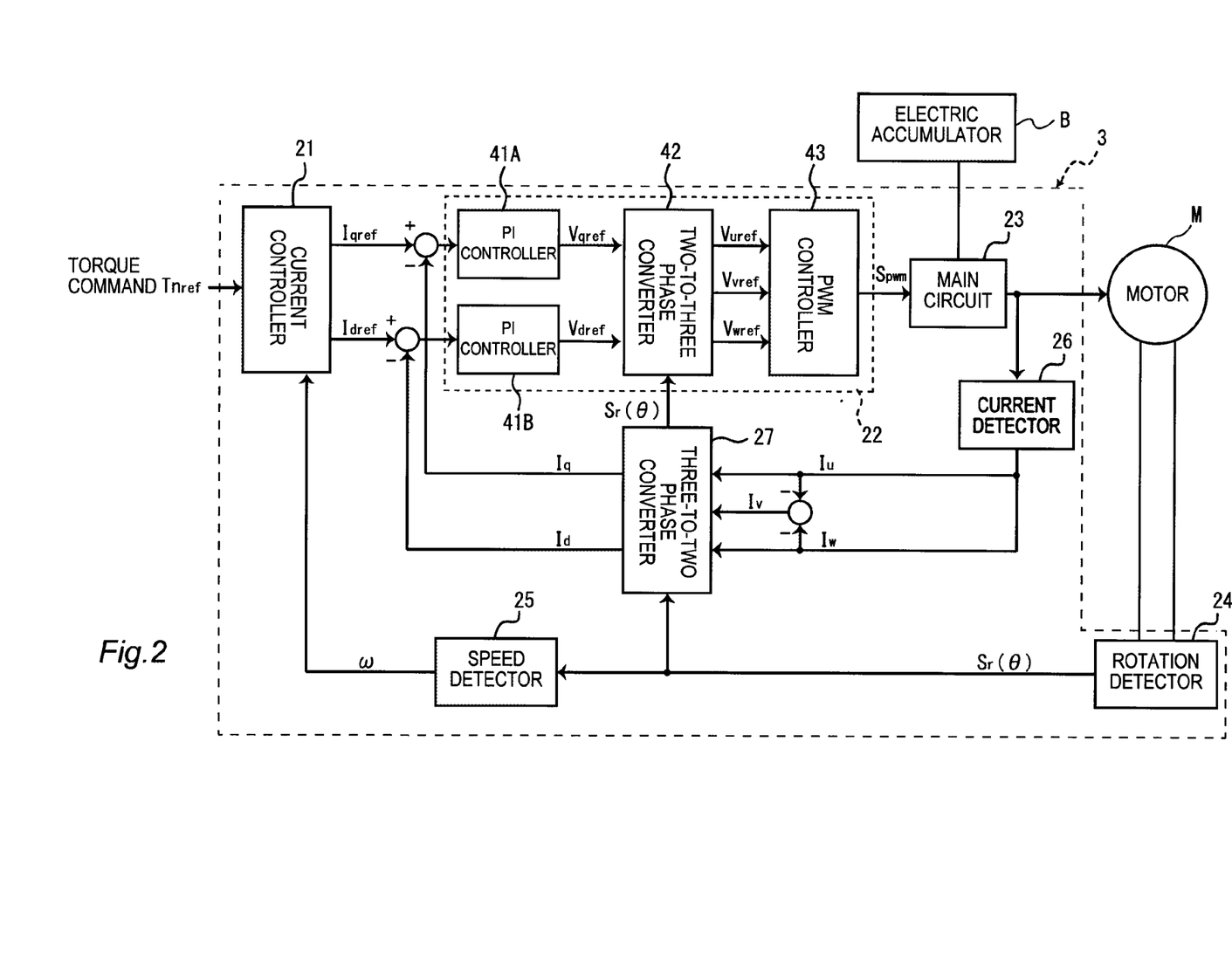
FIG. 2 is a block diagram illustrating a schematic configuration of a motor control unit.

The motor control units 3 control the drive of the motors M on the basis of the torque command $Tn_{ref}$ (drive command) output from the main controller 2. Specifically, each motor control unit 3 includes a current controller 21, a PWM signal generator 22, a main circuit 23, a rotation detector 24, and a speed detector 25. As illustrated in FIG. 2, each motor control unit 3 is also provided with a current detector 26 for detecting a current supplied to a motor M, and a three-to-two phase converter 27 for evaluating a q-axis current $I_q$ and a d-axis current $I_d$ on the basis of the current detected by the current detector 26.

Hereafter, the configuration and functionality of each motor control unit 3 will be described using FIGS. 1 to 3.

As illustrated in FIGS. 1 and 2, the torque command $Tn_{ref}$ is input from a host controller or the like to the current controller 21. The current controller 21 generates and outputs current commands $I_{qref}$ and $I_{dref}$ compliant to the torque command $Tn_{ref}$ thus input. The current commands $I_{qref}$ and $I_{dref}$ output from the current controller 21 are input to the PWM signal generator 22.

Figure 3:
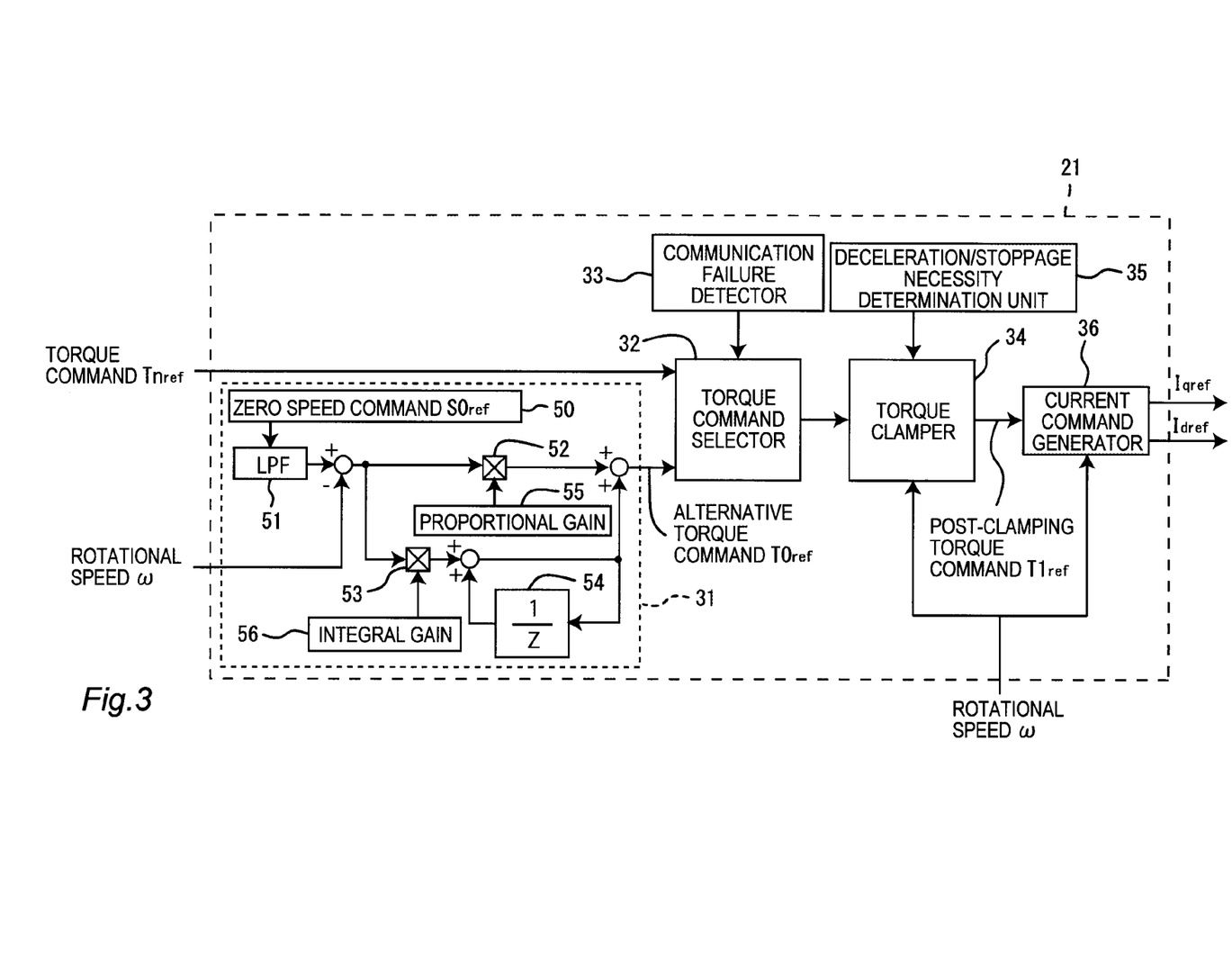
FIG. 3 is a block diagram illustrating a schematic configuration of a current controller.

As illustrated in FIG. 3, the current controller 21 is provided with a speed control unit 31 (deceleration controller) for generating an alternative torque command $T0_{ref}$ (drive command) on the basis of a zero speed command $S0_{ref}$, and a torque command selector 32 (command selector) for selecting the torque command $Tn_{ref}$ if the torque command $Tn_{ref}$ is input from the host controller or the like, or selecting the alternative torque command $T0_{ref}$ if the torque command $Tn_{ref}$ is not input.

The detailed configuration of the current controller 21 will be described later.

As illustrated in FIG. 2, the PWM signal generator 22 generates a PWM control signal $S_{pwm}$ according to the current commands $I_{qref}$ and $I_{dref}$ output from the current controller 21. Specifically, the PWM signal generator 22 is provided with PI controllers 41A and 41B, a two-to-three phase converter 42, and a PWM controller 43.

The PI controllers 41A and 41B calculate voltage commands $V_{qref}$ and $V_{dref}$ used to control the rotational speed of each motor M by a PI control method. More specifically, the PI controller 41A calculates a torque voltage command $V_{qref}$ on the basis of the deviation between the present q-axis current $I_q$ output from the three-to-two phase converter 27 and a q-axis current command $I_{qref}$ and the proportional and integral gains of the PI controller 41A, as illustrated in FIG. 2. The PI controller 41B calculates an exciting voltage command $V_{dref}$ on the basis of the deviation between the present d-axis current $I_d$ output from the three-to-two converter 27 and a d-axis current command $I_{dref}$ and the proportional and integral gains of the PI controller 41B. The PI controller 41A outputs the torque voltage command $V_{qref}$ to the two-to-three phase converter 42, whereas the PI controller 41B outputs the exciting voltage command $V_{dref}$ to the two-to-three phase converter 42.

As illustrated in FIG. 2, the torque voltage command $V_{qref}$ and the exciting voltage command $V_{dref}$ are input from the PI controllers 41A and 41B to the two-to-three phase converter 42. In addition, the rotational angle θ of the motor M is input from the three-to-two phase converter 27 to the two-to-three phase converter 42. On the basis of the rotational angle θ of the motor M, the two-to-three phase converter 42 converts the torque voltage command $V_{qref}$ and the exciting voltage command $V_{dref}$ to three-phase voltage commands $V_{uref}$, $V_{vref}$ and $V_{wref}$.

The PWM controller 43 generates the PWM control signal $S_{pwm}$ compliant to the three-phase voltage commands $V_{uref}$, $V_{vref}$ and $V_{wref}$ and outputs the PWM control signal $S_{pwm}$ to the main circuit 23. The main circuit 23 converts the DC voltage of the electric accumulator B to an AC voltage on the basis of this PWM control signal $S_{pwm}$, thereby supplying a three-phase AC current to the motor M.

As illustrated in FIG. 2, the rotation detector 24 outputs the rotation of the motor M to the speed detector 25 and the three-to-two phase converter 27 as a rotation detection signal $S_r$. The rotation detection signal $S_r$ is defined as the rotational angle θ of the motor M in the present embodiment. The rotation detection signal $S_r$ is not limited in particular to a rotational angle, however, as long as the signal is related to the rotation of the motor M. For example, the rotation detection signal $S_r$ may be a signal representing the amount of rotation of the motor M including the number of revolutions and the like, or a signal representing torque or the like arising in the motor M. In addition, a resolver, a rotary encoder, a magnetic sensor, or the like may be adopted as the rotation detector 24.

The speed detector 25 differentiates the rotational angle θ of the motor M detected by the rotation detector 24 with respect to time to calculate a rotational angular speed ω (hereinafter simply referred to as the rotational speed ω), and outputs this rotational speed ω to the current controller 21. In the current controller 21, the rotational speed ω is used to generate the alternative torque command $T0_{ref}$.

As illustrated in FIG. 2, the current detector 26 detects a U-phase current $I_u$ and a W-phase current $I_w$ flowing through the motor M, and outputs the currents to the three-to-two phase converter 27. A V-phase current $I_v$ is calculated using the U-phase current $I_u$ and the W-phase current $I_w$ output from the current detector 26. The V-phase current $I_v$ thus calculated is also input to the three-to-two phase converter 27.

As illustrated in FIG. 2, the U-phase current $I_u$, the W-phase current $I_w$, the V-phase current $I_v$, and the rotational angle θ of the motor M are input to the three-to-two phase converter 27. On the basis of the rotational angle θ of the motor M, the three-to-two phase converter 27 converts the U-phase current $I_u$, the W-phase current $I_w$ and the V-phase current $I_v$ to the q-axis current $I_q$ and the d-axis current $I_d$. As described above, the q-axis current $I_q$ and the d-axis current $I_d$ are used to calculate voltage commands in the PI controllers 41A and 41B, respectively.

(Current Controller)

Next, the configuration of the current controller 21 will be described in detail using FIG. 3.

The torque command $Tn_{ref}$ output from the main controller 2 and the rotational speed ω output from the speed detector 25 are input to the current controller 21. In addition, the zero speed command $S0_{ref}$ is generated in the current controller 21. The current controller 21 generates a q-axis current command $I_{qref}$ and a d-axis current command $I_{qref}$ according to the torque command $Tn_{ref}$ if the torque command $Tn_{ref}$ is input from the main controller 2. On the other hand, the current controller 21 generates the q-axis current command $I_{qref}$ and the d-axis current command $I_{qref}$ according to the zero speed command $S0_{ref}$, if the torque command $Tn_{ref}$ is not input from the main controller 2.

Specifically, the current controller 21 is provided with a speed control unit 31, a torque command selector 32, a communication failure detector 33, a torque clamper 34 (torque limiter), a deceleration/stoppage necessity determination unit 35, and a current command generator 36.

The speed control unit 31 generates the alternative torque command $T0_{ref}$ on the basis of the zero speed command $S0_{ref}$. Specifically, the speed control unit 31 includes a zero speed command generator 50, a lowpass filter (LPF) 51, multipliers 52 and 53, an integrator element 54, a proportional gain output unit 55, and an integral gain output unit 56.

The zero speed command generator 50 generates and outputs the zero speed command $S0_{ref}$ to the lowpass filter 51. Note that a signal of the zero speed command $S0_{ref}$ may be generated anywhere, as long as the command signal is generated within the motor control unit 3. In addition, the zero speed command generator 50 may generate the zero speed command $S0_{ref}$ either constantly or only if a failure occurs in communication with the main controller 2.

The multiplier 52 multiplies the difference between the zero speed command $S0_{ref}$ and the rotational speed ω output from the speed detector 25 by a proportional gain output from the proportional gain output unit 55. The multiplier 53 multiplies the difference between the zero speed command $S0_{ref}$ and the rotational speed ω by an integral gain output from the integral gain output unit 56.

The integrator element 54 integrates a signal multiplied by the integral gain by the multiplier 53. The signal thus calculated by the integrator element 54 is added to the signal obtained by the multiplier 53. The proportional gain output unit 55 and the integral gain output unit 56 output a previously-stored proportional gain and integral gain, respectively. Note that alternatively, the proportional gain output unit 55 and the integral gain output unit 56 may calculate and output a proportional gain and an integral gain, respectively.

The signal calculated by the multiplier 52 and the signal obtained by adding the signal calculated by the integrator element 54 to the signal calculated by the multiplier 53 are added to each other and output as the alternative torque command $T0_{ref}$.

The speed control unit 31 configured as described above generates such a torque command (alternative torque command $T0_{ref}$) as to cause the rotational speed of the motor M to be zero, according to the zero speed command $S0_{ref}$.

The torque command selector 32 selects one of the torque command $Tn_{ref}$ output from the main controller 2 and the alternative torque command $T0_{ref}$ output from the speed control unit 31, according to an output signal (communication failure signal) from the communication failure detector 33, and outputs the selected command as the drive command for the motor M. That is, the torque command $Tn_{ref}$ output from the main controller 2 and the alternative torque command $T0_{ref}$ output from the speed control unit 31 are input to the torque command selector 32. The torque command selector 32 selects and outputs the torque command $Tn_{ref}$ if no failure is present in communication between the main controller 2 and the motor control unit 3. On the other hand, the torque command selector 32 selects and outputs the alternative torque command $T0_{ref}$ output from the speed control unit 31 if any failure in communication between the main controller 2 and the motor control unit 3 is detected by the communication failure detector 33.

The communication failure detector 33 outputs a communication failure signal to the torque command selector 32 if the detector detects any failure in communication between the main controller 2 and the motor control unit 3. The communication failure detector 33 outputs the communication failure signal if communication between the main controller 2 and the motor control unit 3 falls into an abnormal state due to, for example, disconnection or for any other reason.

The torque clamper 34 limits a torque command output from the torque command selector 32 to a predetermined value or lower, in order to limit the output of the motor M. Specifically, the torque clamper 34 limits the torque command so as to fall within a range of torque values (predetermined torque value or lower) shown by a solid line or a single-dot chain line according to the rotational speed of the motor M output from the speed detector 25, as illustrated in, for example, FIG. 4.

Figure 4:
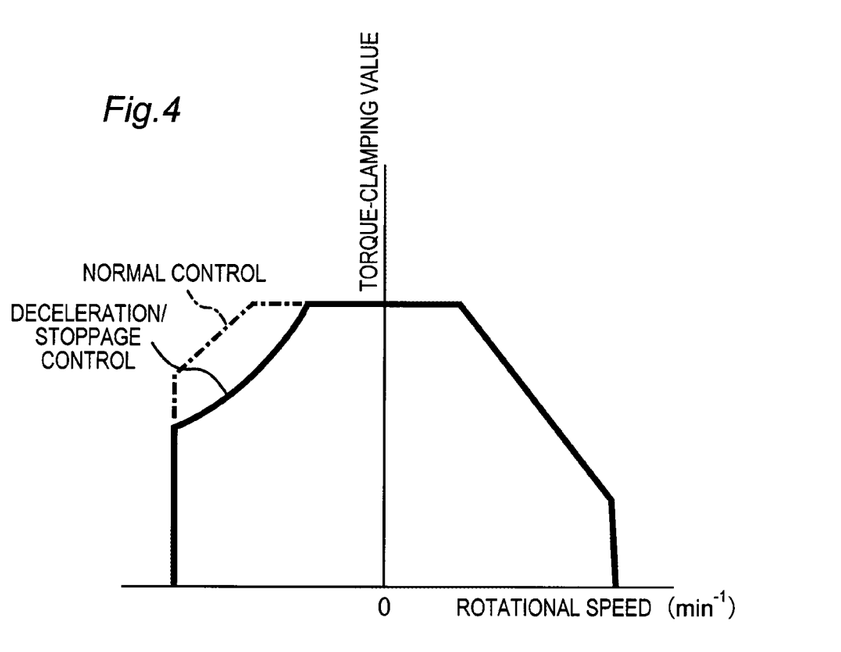
FIG. 4 is a graphical representation illustrating one example of the relationship between a rotational speed and a torque-clamping value.

In FIG. 4, the solid line shows a range of torque limiting values in a case where the torque command $Tn_{ref}$ is not input from the main controller 2 and control for driving the motor M according to the alternative torque command $T0_{ref}$ output from the speed control unit 31 (hereinafter referred to as deceleration/stoppage control) is performed. A quadrant where the rotational speed is positive in FIG. 4 is an area where the motor M is submitted to power running operation, whereas a quadrant where the rotational speed is negative in FIG. 4 is an area where the motor M is submitted to regenerative operation.

Note that in part of the range of rotational velocities during the regenerative operation of the motor M, a torque limiting value at the time of deceleration/stoppage control is set to a value smaller than a torque limiting value in a case where control for driving the motor M according to the torque command $Tn_{ref}$ output from the main controller 2 (hereinafter referred to as normal control) is performed (as shown by the single-dot chain line in FIG. 4). Consequently, the heat generation of the motor M when the motor M is stopped by regenerative operation can be placed in an allowable range at the time of deceleration/stoppage control.

As illustrated in FIG. 3, a signal output from the deceleration/stoppage necessity determination unit 35 is input to the torque clamper 34. The deceleration/stoppage necessity determination unit 35 determines whether or not the motor M is a device to be submitted to deceleration/stoppage control, as will be described later, if any failure occurs in communication with the main controller 2. If the motor M is determined by this deceleration/stoppage necessity determination unit 35 to be a device subject to deceleration and stoppage, a deceleration/stoppage determination signal is output from the deceleration/stoppage necessity determination unit 35 to the torque clamper 34. The torque clamper 34 sets the torque limiting value to a value (shown by the solid line in FIG. 4) smaller than a torque limiting value (shown by the single-dot chain line in FIG. 4) at the time of normal control in part of a rotational speed range (a range where the rotational speed is high in the example of FIG. 4) during the regenerative operation of the motor M, as illustrated in FIG. 4, if the deceleration/stoppage determination signal is output.

The deceleration/stoppage necessity determination unit 35 determines whether or not the motor M is a device subject to deceleration and stoppage, if any communication failure occurs between the main controller 2 and the motor control unit 3. Specifically, the deceleration/stoppage necessity determination unit 35 determines, according to the purpose of use and the specifications of the motor M, whether or not the motor M needs to be decelerated and stopped if any communication failure occurs between the main controller 2 and the motor control unit 3. Data on each motor M is previously stored in an unillustrated memory or the like within the motor control unit 3. If the motor M is determined by the deceleration/stoppage necessity determination unit 35 to be a device subject to deceleration and stoppage, a deceleration/stoppage determination signal is output to the torque clamper 34. Note that if the motor M is determined by the deceleration/stoppage necessity determination unit 35 to be a device not subject to deceleration and stoppage, the motor control unit 3 shuts an unillustrated gate. Consequently, the motor M continues to rotate until it stops by itself due to friction and the like.

The current command generator 36 generates the q-axis current command $I_{qref}$ and the d-axis current command $I_{dref}$ on the basis of a torque command (hereinafter referred to as the post-clamping torque command $T1_{ref}$) limited by the torque clamper 34. Specifically, the post-clamping torque command $T1_{ref}$ and the rotational speed ω of the motor M are input to the current command generator 36. The current command generator 36 generates the q-axis current command $I_{qref}$ and the d-axis current command $I_{dref}$ used to vector-control the motor M, according to the post-clamping torque command $T1_{ref}$ and the rotational speed ω.

As described above, the current controller 21 controls the drive of the motor M using the torque command $Tn_{ref}$ if the torque command $Tn_{ref}$ is input from the main controller 2. In a case where any failure occurs in communication with the main controller 2, the current controller 21 controls the drive of the motor M using the alternative torque command $T0_{ref}$ output from the speed control unit 31, so that the speed of the motor M decreases to zero, if the motor M is a device subject to deceleration/stoppage control. Consequently, it is possible to prevent the motor M from falling into a free-running state. Accordingly, it is possible to safely and rapidly stop the motor M even if any failure occurs in communication with the main controller 2.

(Operation of Current Controller)

Next, the deceleration/stoppage control of the current controller 21 having such a configuration as described above will be described using the flowchart of FIG. 5.

Figure 5:
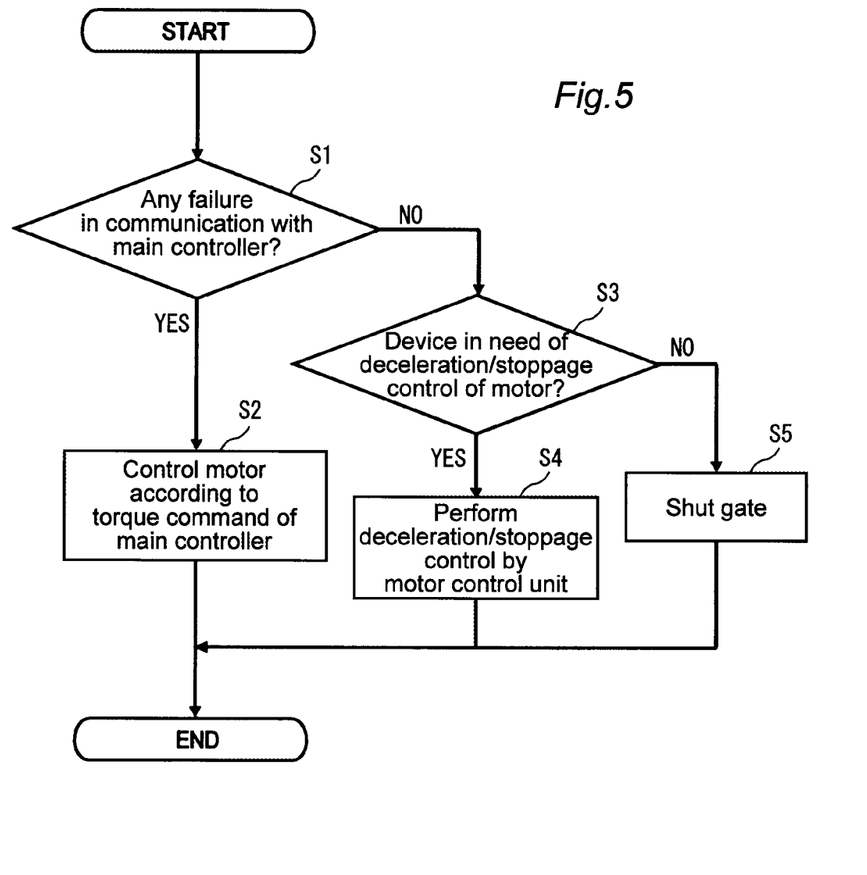
FIG. 5 is a flowchart illustrating a behavior of deceleration/stoppage control by a motor control unit.

When the flow illustrated in FIG. 5 starts (START), the communication failure detector 33 determines whether or not communication between the main controller 2 and the motor control unit 3 is performed normally (step S1).

If a determination is made by the communication failure detector 33 that communication between the main controller 2 and the motor control unit 3 is performed normally (if "YES" in step S1), the current controller 21 controls the motor M on the basis of the torque command $Tn_{ref}$ output from the main controller 2 (step S2). Specifically, the torque command selector 32 outputs the torque command $Tn_{ref}$ output from the main controller 2 to the torque clamper 34. The torque clamper 34 limits the torque command to a value within the range shown by the solid line and the single-dot chain line in FIG. 4, and then outputs the torque command to the current command generator 36 as the post-clamping torque command $T1_{ref}$. The current command generator 36 generates and outputs the q-axis current command $I_{qref}$ and the d-axis current command $I_{dref}$ according to the post-clamping torque command $T1_{ref}$ thus input.

Thereafter, this flow is completed (END).

On the other hand, if a determination is made by the communication failure detector 33 that communication between the main controller 2 and the motor control unit 3 is abnormal (if "NO" in step S1), the deceleration/stoppage necessity determination unit 35 determines whether or not the motor M is a device subject to deceleration/stoppage control (a device necessary to be submitted to deceleration/stoppage control) (step S3).

If the motor M is determined by the deceleration/stoppage necessity determination unit 35 to be a device subject to deceleration/stoppage control (if "YES" in step S3), deceleration/stoppage control is performed by the motor control unit 3 (step S4).

Specifically, the torque command selector 32 selects the alternative torque command $T0_{ref}$ output from the speed control unit 31 on the basis of a communication failure signal output from the communication failure detector 33, and outputs the alternative torque command $T0_{ref}$ to the torque clamper 34. The alternative torque command $T0_{ref}$ is a torque command used to set the rotational speed of the motor M to zero. That is, the alternative torque command $T0_{ref}$ is a torque command used to decelerate and stop the motor M by causing the motor M to undergo regenerative operation.

The torque clamper 34 sets the torque limiting value to a value smaller than the torque limiting value at the time of normal control in part of the rotational speed range of regenerative operation (changes the range of torque limiting values shown by the single-dot chain line in FIG. 4 to the range shown by the solid line), according to the deceleration/stoppage determination signal output from the deceleration/stoppage necessity determination unit 35. The torque clamper 34 limits the alternative torque command $T0_{ref}$ to within the range shown by the solid line in FIG. 4, and outputs the alternative torque command to the current command generator 36 as the post-clamping torque command $T1_{ref}$. Consequently, the torque command when the motor M is submitted to regenerative operation can be set to within such a range as to be able to suppress the heat generation of the motor M.

The current command generator 36 generates and outputs the q-axis current command $I_{qref}$ and the d-axis current command $I_{dref}$ according to such a post-clamping torque command $T1_{ref}$ as to decrease the rotational speed while suppressing the heat generation of the motor M.

On the other hand, if the motor M is determined by the deceleration/stoppage necessity determination unit 35 to be a device not subject to deceleration and stoppage (if "NO" in step S3), the motor control unit 3 shuts an unillustrated gate and stops current supply to the motor M (step S5). Consequently, the rotational speed of the motor M gradually decreases due to friction and the like.

After deceleration/stoppage control (step S4) and gate shutdown (step S5) are performed by such a motor control unit 3 as described above, this flow is completed (END).

Figure 6:
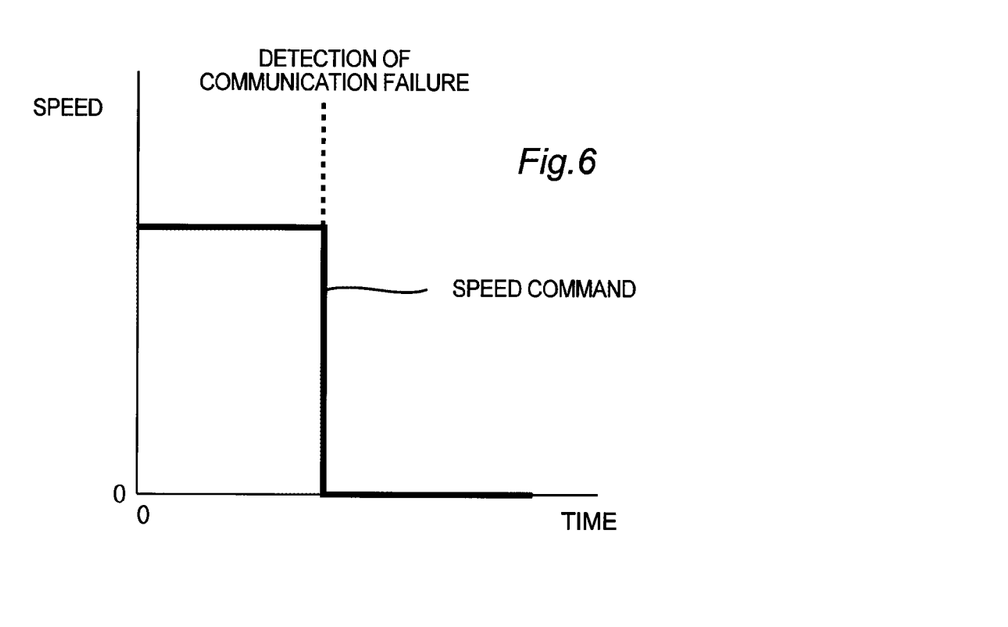
FIG. 6 is a graphical representation illustrating one example of change in a speed command.

FIG. 6 schematically illustrates a change in a speed command given to the motor M when a communication failure between the main controller 2 and the motor control unit 3 is detected by the communication failure detector 33 in the motor controller 1 of the present embodiment. If any failure in communication between the main controller 2 and the motor control unit 3 is detected as illustrated in FIG. 6, the motor control unit 3 generates the alternative torque command $T0_{ref}$, so that the speed command decreases to zero. Consequently, it is possible to rapidly and safely stop the motor M if any failure occurs in communication between the main controller 2 and the motor control unit 3.

As described above, in the motor controller 1 in which each motor M is driven by an associated motor control unit 3 according to the torque command $Tn_{ref}$ output from the main controller 2, the motor control unit 3 includes a speed control unit 31 used to decelerate and stop the motor M if any failure occurs in communication with the main controller 2. Consequently, it is possible to safely and rapidly decelerate and stop the motor M even if the torque command $Tn_{ref}$ is not input from the main controller 2 to the motor control unit 3.

In addition, the motor control unit 3 includes a torque command selector 32 for selecting one of the torque command $Tn_{ref}$ output from the main controller 2 and the alternative torque command $T0_{ref}$ output from the speed control unit 31, according to the presence/absence of failure in communication with the main controller 2. Consequently, it is possible to easily switch between the torque command $Tn_{ref}$ and the alternative torque command $T0_{ref}$. Accordingly, it is possible to more reliably and rapidly decelerate and stop the motor M even if any failure occurs in communication between the main controller 2 and the motor control unit 3.

Yet additionally, the motor control unit 3 includes the deceleration/stoppage necessity determination unit 35 for determining whether or not the motor M is a device to be submitted to deceleration/stoppage control. If the motor M is determined by the deceleration/stoppage necessity determination unit 35 to be a device not subject to deceleration/stoppage control, the motor control unit 3 shuts a gate. On the other hand, if the motor M is determined by the deceleration/stoppage necessity determination unit 35 to be a device subject to deceleration/stoppage control, deceleration/stoppage control is performed by the motor control unit 3. Consequently, it is possible to perform deceleration/stoppage control by the motor control unit 3 on a device in need of deceleration/stoppage control. In addition, it is possible to prevent deceleration/stoppage control by the motor control unit 3 from being performed on a device not in need of deceleration/stoppage control.

If the motor M is determined by the deceleration/stoppage necessity determination unit 35 to be a device subject to deceleration/stoppage control, the torque limiting value is made smaller by the torque clamper 34, compared with a torque limiting value at the time of normal control, in at least part of the rotational speed range of regenerative operation. Consequently, it is possible to prevent the temperature of the motor M from rising when regenerative operation is performed on the motor M as deceleration/stoppage control.

Higher advantageous effects can be obtained by providing a construction machine with the motor controller 1 having the above-described configuration. That is, in a case where the motor M is configured to, for example, turn the construction machine, it is possible to safely and rapidly decelerate and stop the motor M without placing the motor M in a free-running state even if any failure occurs in communication between the main controller 2 and the motor control unit 3.

Modified Example of Embodiment 1

Figure 7:
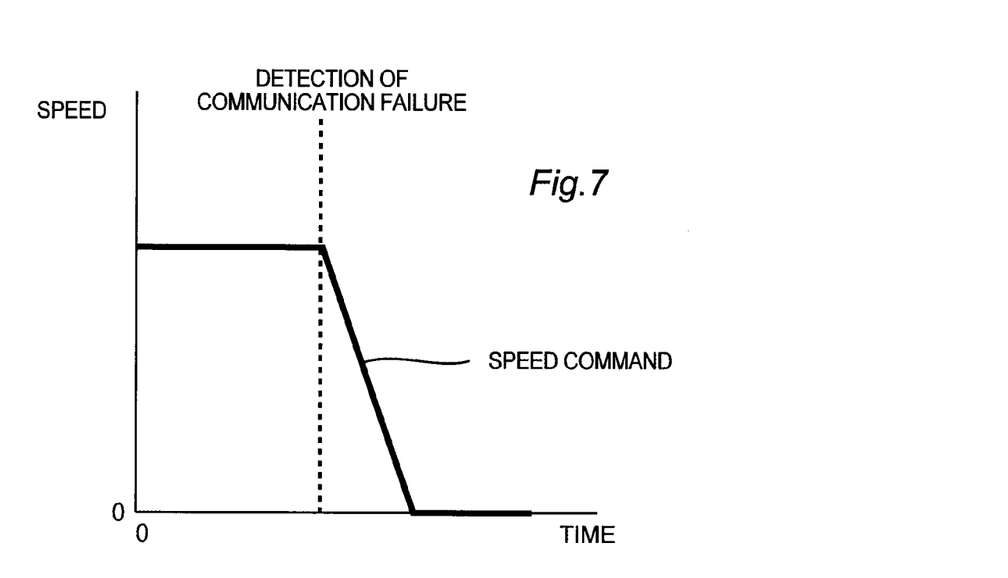
FIG. 7 is a graphical representation corresponding to FIG. 6 in a motor controller according to a modified example of Embodiment 1.

FIG. 7 illustrates a modified pattern of the speed command of a motor controller in a modified example of Embodiment 1. The motor controller of this modified example is the same in configuration as the motor controller 1 of Embodiment 1, but differs only in the pattern of a speed command generated in the zero speed command generator 50 of the speed control unit 31 of the motor control unit 3. In the description to be given hereafter, the same constituent elements as those of Embodiment 1 are denoted by the same reference numerals and characters as used in Embodiment 1 and will be excluded from the description.

In this modified example, the zero speed command generator 50 generates a speed command which causes the speed of the motor M to gradually approach zero with time, so that the speed decreases linearly, as illustrated in FIG. 7, if any failure is detected in communication between the main controller 2 and the motor control unit 3. Note that FIG. 7 illustrates a speed command, by way of example, in which the speed decreases linearly with time. Without limitation to this example, however, the zero speed command generator 50 may generate a speed command, other than the speed command having the pattern illustrated in FIG. 7, in which the speed decreases nonlinearly with time.

Consequently, the speed of the motor M gradually decreases if a communication failure is detected between the main controller 2 and the motor control unit 3. Accordingly, it is possible to prevent the motor M from decelerating or stopping suddenly.

Embodiment 2

Figure 8:
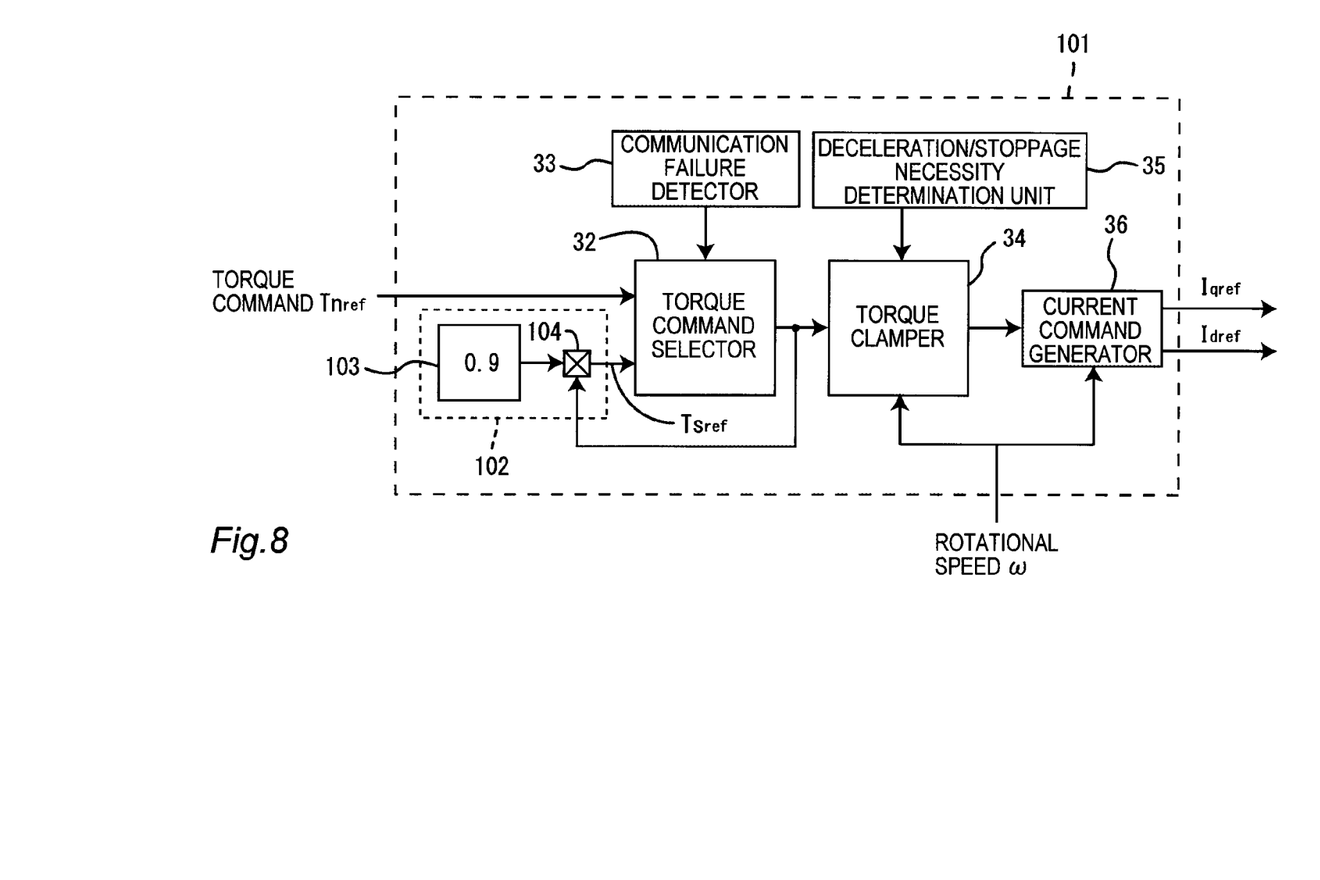
FIG. 8 is a block diagram illustrating the schematic configuration of a current controller of a motor controller according to Embodiment 2.

FIG. 8 illustrates the schematic configuration of a current controller 101 of a motor controller according to Embodiment 2. This embodiment differs in configuration from Embodiment 1 in that the current controller 101 includes a torque command subtracter 102 (deceleration controller), rather than a speed control unit. In the following discussion, the same constituent elements as those of Embodiment 1 are denoted by the same reference numerals and characters as used in Embodiment 1 and will not be described again. Instead, a description will be given mainly of constituent elements different from those of Embodiment 1.

As illustrated in FIG. 8, the current controller 101 is provided with a torque command subtracter 102, a torque command selector 32, a communication failure detector 33, a torque clamper 34, a deceleration/stoppage necessity determination unit 35, and a current command generator 36. The torque command selector 32, the communication failure detector 33, the torque clamper 34, the deceleration/stoppage necessity determination unit 35 and the current command generator 36 are the same constituent elements as those of Embodiment 1, and therefore, will not be described again here.

The torque command subtracter 102 multiplies a torque command output from the torque command selector 32 by a predetermined coefficient smaller than 1 (0.9 in the present embodiment) to decrease an alternative torque command $Ts_{ref}$ to be input to the torque command selector 32. Specifically, the torque command subtracter 102 includes a coefficient output unit 103 and a multiplier 104. The coefficient output unit 103 previously stores the predetermined coefficient smaller than 1 and outputs the coefficient to the multiplier 104. Note that the coefficient of the coefficient output unit 103 may be a value other than 0.9, or a variable rather than a steady value.

The multiplier 104 multiplies a torque command output from the torque command selector 32 by a coefficient output from the coefficient output unit 103. Consequently, there is obtained a torque command smaller than the torque command output from the torque command selector 32. The torque command thus obtained using the multiplier 104 is input to the torque command selector 32 as the alternative torque command $Ts_{ref}$.

The torque command selector 32 outputs a torque command $Tn_{ref}$ input from the main controller 2 to the torque clamper 34 when communication between the main controller 2 and the motor control unit is performed normally. On the other hand, the torque command selector 32 outputs the alternative torque command $Ts_{ref}$ calculated using the torque command output from the torque command selector 32 immediately before failure detection to the torque clamper 34 using the torque command subtracter 102, if any communication failure is detected by the communication failure detector 33 between the main controller 2 and the motor control unit. At this time, the torque command subtracter 102 decreases the torque command output from the torque command selector 32 and once again inputs the torque command to the torque command selector 32. The torque command output from the torque command selector 32 therefore decreases gradually. Note that even if the torque command output from the torque command selector 32 is a signal "0", the torque command subtracter 102 continues to output an alternative torque command signal "0".

In the present embodiment, the torque command of the motor M can be calculated by the torque command subtracter 102 using a torque command output from the torque command selector 32 immediately before a failure occurs in communication between the main controller 2 and the motor control unit. Consequently, the motor M can be driven and controlled by the motor control unit even if the torque command $Tn_{ref}$ is not input from the main controller 2.

In addition, since the torque command given to the motor M can be gradually decreased using the torque command subtracter 102, it is possible to gradually decelerate and stop the motor M.

Other Embodiments

Having thus described the embodiments of the present invention, the above-described embodiments are merely examples for carrying out the present invention. Accordingly, the present invention is not limited to the above-described embodiments, and therefore, the embodiments may be modified as appropriate and carried out without departing from the gist of the invention.

In the above-described respective embodiments, the motor controller 1 is provided with a plurality of motor control units 3 for controlling the drive of motors M according to the torque command $Tn_{ref}$ output from the main controller 2. Only one motor control unit 3 may be provided for the main controller 2, however.

Also in the above-described respective embodiments, the torque command selector 32 selects one of the torque command $Tn_{ref}$ output from the main controller 2 and the alternative torque command $T0_{ref}$ or $Ts_{ref}$ generated within the motor control unit 3 according to the presence/absence of failure in communication between the main controller 2 and the motor control unit 3. The motor control unit may have any configuration, however, as long as the configuration allows the deceleration/stoppage control of a motor M to be performed by the motor control unit if any failure occurs in communication between the main controller 2 and the motor control unit.

Also in the above-described respective embodiments, each motor control unit 3 continues deceleration/stoppage control until a motor M stops, if any failure occurs in communication with the main controller 2. However, the motor control unit 3 may be configured so as to continue deceleration/stoppage control until the rotational speed of the motor M decreases to a predetermined value or lower. That is, the motor control unit 3 may set a speed command to be given to the motor M to a predetermined value, rather than zero, if any failure occurs in communication between the main controller 2 and the motor control unit 3.

Also in the above-described respective embodiments, the rotational speed of each motor M is decreased to zero only by means of deceleration/stoppage control by each motor control unit 3. An unillustrated mechanical brake may be used concomitantly, however, if the motor M has to be decelerated or stopped as soon as possible. Consequently, it is possible to more rapidly decelerate or stop the motor M, compared with a case where the motor M is decelerated or stopped with a mechanical brake alone. In addition, loads on the mechanical brake are relieved, thereby extending the operating life of the mechanical brake.

Also in the above-described respective embodiments, each motor M is an IPM motor. Without limitation to this configuration, however, the motor M may be, for example, an SPM motor or an AC motor.

What is claimed is:

1. A motor controller comprising:
a controller; and
a motor control unit configured to be capable of communicating with the controller to drive a motor according to a drive command output from the controller, the motor control unit including a deceleration controller for outputting a drive command, so as to decelerate the motor, if any failure occurs in communication with the controller while the motor is being driven
a communication failure detector for detecting a failure in communication with the controller; and
a command selector for selecting a drive command output from the controller as a drive command for the motor if any communication failure is not detected by the communication failure detector, or selecting a drive command output from the deceleration controller as a drive command for the motor if a communication failure is detected by the communication failure detector.

2. The motor controller according to claim 1, wherein the deceleration controller performs regenerative operation on the motor so as to decelerate the motor.

3. The motor controller according to claim 1, wherein the drive command is a torque command, and the motor control unit further includes a torque limiter for limiting the torque command to a predetermined value or smaller, the torque limiter being configured to, in at least part of a rotational speed range in the regenerative operation region of the motor, make the predetermined value lower than a torque limiting value at the time of normal control of the motor, if any communication failure is detected by the communication failure detector.

4. A construction machine comprising:
a motor controller according to claim 1; and
a motor controlled by the motor controller.

* * * * *